United States Patent

[11] 3,590,317

| [72] | Inventor | Kurt H. Sennowitz<br>Royal Oak, Mich. |
|---|---|---|
| [21] | Appl. No. | 857,966 |
| [22] | Filed | Sept. 15, 1969 |
| [45] | Patented | June 29, 1971 |
| [73] | Assignee | Elox Inc.<br>Troy, Mich.<br>Continuation of application Ser. No.<br>723,726, Apr. 24, 1968, now abandoned. |

[54] ELECTRICAL DISCHARGE MACHINING PULSE CURRENT CONTROL APPARATUS
3 Claims, 1 Drawing Fig.

[52] U.S. Cl. .................................................. 315/332,
315/127, 315/224, 315/225, 219/69 C, 219/69 S,
219/69 P

[51] Int. Cl. ........................................................ H01j 11/04,
H01j 13/48, H01j 17/36
[50] Field of Search. .......................................... 315/224,
225, 127, 332; 219/69 C, 69 S, 69 P

[56] References Cited
UNITED STATES PATENTS
3,277,337  10/1966  Webb .......................... 315/127

*Primary Examiner*—John W. Huckert
*Assistant Examiner*—B. Estrin
*Attorney*—Radford W. Luther

ABSTRACT: A circuit for providing electrical discharge machining power pulse on-off time control responsive to gap open circuit condition with controlled timing of pulse narrowing and return to normal pulse duration.

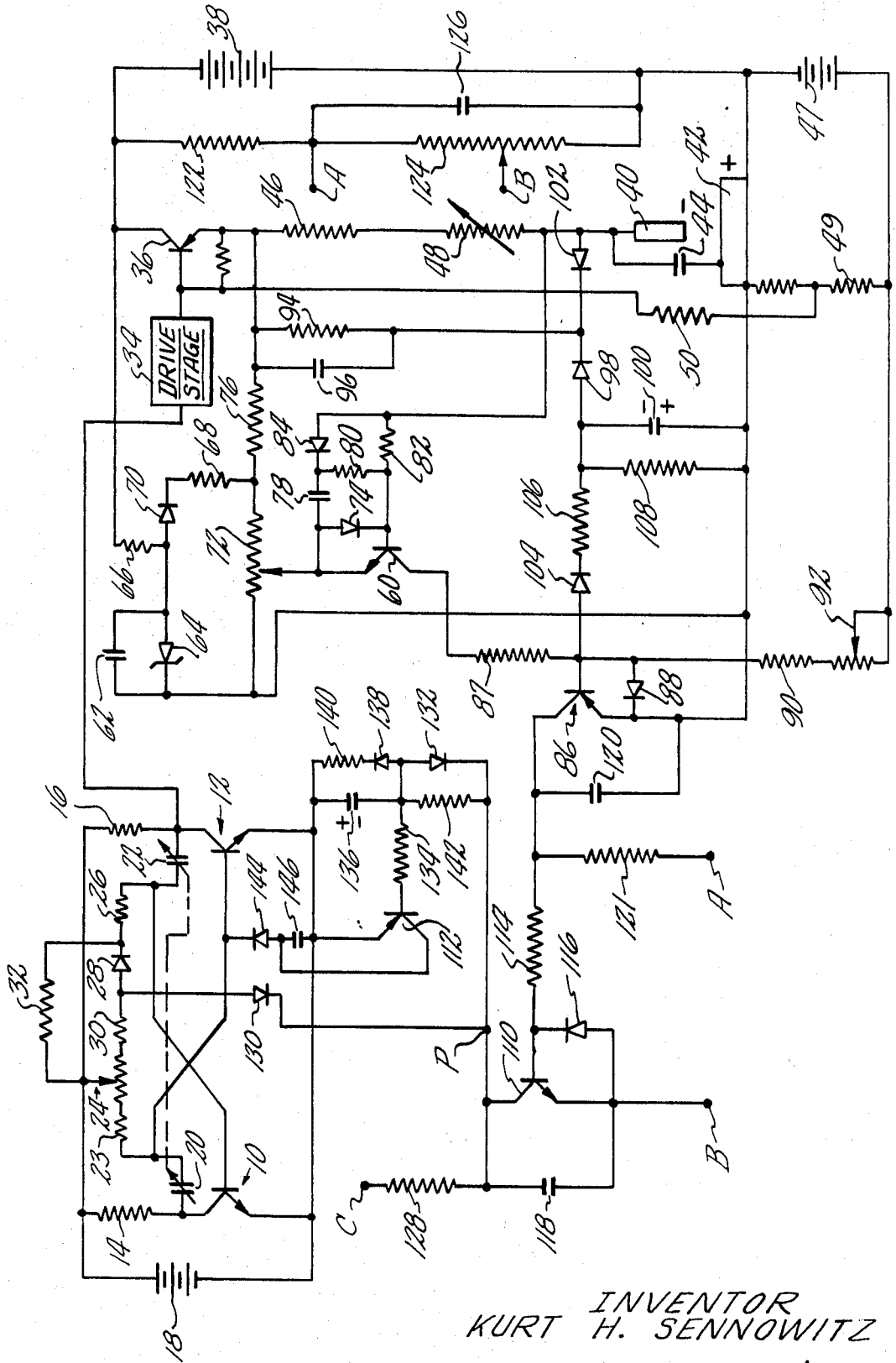

ELECTRICAL DISCHARGE MACHINING PULSE CURRENT CONTROL APPARATUS

CROSS-REFERENCE TO RELATED APPLICATION

This application is a continuation of my application Ser. No. 723,726 filed on Apr. 24, 1968 and now abandoned.

BACKGROUND OF THE INVENTION

The field to which my invention relates is that known as electrical discharge machining in which material is removed from an electrically conductive workpiece by the action of electrical gap discharges between a tool electrode and the workpiece. An electrode servo feed system is employed to maintain an optimum gap spacing between electrode and workpiece as material is removed. A dielectric coolant is circulated through the gap during operation. For best results, a power supply of the independent pulse generator type is utilized to provide machining pulses of precisely controllable frequency and current magnitude.

During the machining operation, the gap may become bridged by workpiece particles to cause a condition known as gap short circuit. This condition is accompanied by excessive localized heat which tends to damage both electrode and workpiece unless corrective action is promptly taken. Such corrective action may include servo feed withdrawal or complete interruption of machining current to the gap. Reliance on either of these methods may substantially reduce the rate of machining. An equally important problem is present at the beginning of any machining operation on initial approach of electrode to workpiece. If the coolant flow is insufficient or the current is excessive for the initially opposed electrode-workpiece areas, gap short circuit may immediately result with damage to electrode, workpiece or both. The localized heating that results similarly to a short circuit condition may cause cracking of the electrode on its machining face or may cause a local melt area damage to the workpiece. Reference is made to the disclosure of U.S. application Ser. No. 617,700, filed on Feb. 21, 1967, on behalf of Walter Lobur for "Electrical Discharge Machining Pulse Current Control Apparatus and Method" which application is of common ownership herewith. The aforementioned application discloses the basic theory and several embodiments of circuits for pulse narrowing.

SUMMARY OF THE INVENTION

My invention provides an improved circuit for pulse narrowing. The gist of my invention is the provision of selective machining pulse on-off time control responsive to gap open-circuit condition to eliminate the problems above referred to. Proper timing of the narrowing effect and of the resumption of pulse duty factor to the normal level is further provided after removal of the aforesaid conditions. BRIEF DESCRIPTION OF THE DRAWINGS The drawing is a combined schematic and block diagrammatic showing of an electrical discharge machining power supply of the transistor type with a pulse narrowing circuit according to my invention incorporated therein. DESCRIPTION Referring now to the drawing, a pulsating drive signal is generated by an astable multivibrator including a pair of NPN transistors 10, 12, biased and coupled for alternate operation. Transistors 10 and 12 are connected respectively through load resistors 14 and 16 to the positive terminal of plate supply 18.

Cross-coupling capacitors 20 and 22 are adjustable by ganged control and cross-couple the collectors of transistors 10 and 12 each to the opposing transistor base. The base of transistor 12 is returned to the positive terminal of the power supply 18 through a limiting resistor 23 and a portion of potentiometer 24. The base of transistor 10 is similarly returned through a limiting resistor 26, diode 28, resistor 30 and a portion of potentiometer 24 to complete the connection of the multivibrator circuit itself. A resistor 32 is shunted across diode 28, resistor 30 and the right-hand portion of potentiometer 24. It will be seen that variable capacitors 20, 22 operate in conjunction with their associated base resistors to form the operating time constants of the multivibrator. The frequency of operation of the multivibrator may be altered by changing the values of capacitors 20, 22 by a ganged switch while the on-off time ratio or duty factor may be selectively changed according to the setting of the movable tap of potentiometer 24. The frequency and on-off times may thus be selectively varied, each one independently of the other.

The signal output across multivibrator transistor 12 is coupled to at least one intermediate drive stage 34 where the drive signal is amplified and resquared.

The output signal from drive stage 34 is used to drive a transistor 36 to render it alternately conductive and nonconductive to provide machining pulses across the gap. While the electronic switches employed in the embodiment of this invention are transistors, the invention is not so limited but, with proper redesign of the circuit by one skilled in the art, any electronic switch may be substituted as will be explained hereinafter. The principal electrodes, collector and emitter, of transistor 36 are connected serially with the main power supply 38 to the machining gap. Electrode 40 and workpiece 42 comprise the machining gap with a polarity as shown. Electrode 40 is maintained in spaced relationship to workpiece 42 by a suitable servo feed system as is well known in the electrical discharge machining art. A capacitor 44 may be connected across the gap for finish machining. Series resistors 46, 48 are connected in series with the gap to allow selective control of cutting current.

A bias voltage source 47 together with resistors 49 and 50 provides a turnoff bias to the base of transistor 36. The remainder of the circuitry shown in the drawing relates to short circuit or open-circuit pulse narrowing. The operation of the pulse narrowing circuit is to provide a control voltage to the power supply multivibrator to selectively vary its pulse on-time and off-time responsive to gap open circuit or gap short circuit and hence to control properly the magnitude of machining power during these conditions.

The short circuit control circuit includes transistor 60. A regulated reference voltage supply is included to provide reliable operation even during high frequency operation and narrow trigger pulse operation. The regulated voltage supply includes the network connected at its lower end to the positive gap terminal at workpiece 42 and including zener diode 64, shunt capacitor 62, resistors 66, 68, diode 70 and potentiometer 72. The upper end of the reference voltage network is connected to the minus terminal of main power supply 38. Transistor 60 has diode 74 connected across its base-emitter junction to protect it from excess turnoff voltage. Transistor 60 further has its emitter tied to the upper terminal of limiting resistor 46 through resistor 76 and potentiometer 72. The base of transistor 60 is tied to the lower terminal of rheostat 48 through the network including capacitor 78, resistors 80, 82 and diode 84. Diode 84 stores error voltage on capacitor 78. Capacitor 78 discharges through resistor 80 into the base of transistor 60 to slightly prolong its conduction time. The output of transistor 60 is passed through resistor 87 to provide turn-on of transistor 86.

The open arc narrowing circuit comprises the circuitry associated with transistor 86. Diode 88 is connected across the base-emitter junctions of transistor 86 to protect it from excess turnoff voltage. A positive turnoff bias is applied across the base-emitter of transistor 86 through resistor 90 and potentiometer 92. Potentiometer 92 is adjustable to hold off transistor 86 during normal cutting voltage condition. Depending on the electrode and workpiece material, coolant, and pulse frequency, normal cutting voltage may range between 20 to 35 volts. During an open arc circuit, the negative turn-on signal is taken from the output being furnished from transistor 36 to the machining gap. Resistor 94 and capacitor 96 couple the signal during transistor 36 off-time through diode 98 to charge capacitor 100 to the voltage polarity shown. Diode 102 is phased to pass the signal to the gap if the gap voltage should drop. The signal is clamped to the negative gap voltage. Decoupling diode 104 and resistor 106 transfer the minus turn-on signal to the base of transistor 86 to turn it "on" on gap open circuit level such as occurs on initial downfeed when the machining operation is commenced. The gap open-circuit narrowing circuit has an advantage derived from the use of a divider network including capacitor 96, resistor 94 and capacitor 100, resistor 108, which RC networks are separated by diode 98. Resistor 106 has the effect of limiting transistor 86 drive current. Diode 104 has the function of holding off the transistor 86 shorted arc cutoff signal from appearing on capacitor 100 whereby more stable operation results during a gap short circuit condition.

The pulse narrowing circuit further includes transistors 110 and 112. Transistor 110 is an NPN transistor and is normally in an open state when proper cutting is occurring. Responsive to either gap short circuit or gap open circuit, transistor 86 is triggered on to provide a plus signal to the base of transistor 110 through decoupling resistor 114 to turn it on. Transistor 110 has its base-emitter junction shunted by protective diode 116. Condensers 118 and 120 are filter, bypass condensers to eliminate false turn-on of the transistors from stray pickup oscillations in the circuit. The negative operating voltages for transistor 110 are provided at points B and A with series resistor 121 connected as shown. These voltages are derived from resistor 122, and the setting of potentiometer 124, both of which are connected across main power supply 38 as shown in the right-hand portion of the drawing. Filter capacitor 126 is connected in shunt with the variable resistance of potentiometer 124.

The final stage of the pulse narrowing circuit is that network connected to the multivibrator and associated with transistor 112. A positive voltage source is coupled at point C and connectable through resistor 128 to point P to restore the multivibrator to its normal interference-free operation after cessation of gap short circuit or gap open circuit condition. Transistor 112 is turned on by the negative voltage provided at point B when transistor 110 is turned on. This negative voltage is passed through diode 130 to control multivibrator pulse off-time. The negative voltage is also passed through diode 132 and resistor 134 to the base of transistor 112 to turn it on and control the multivibrator pulse on-time. Diode 132 permits a fast charge of capacitor 136 and facilitates a rapid turn-on of transistor 112. The network comprising diode 138 and resistor 140 protects the emitter base junction from excess turnoff voltage. This network further limits the voltage to which capacitor 136 may be charged. The proper turnoff bias on transistor 112 is provided through resistors 128 and 142. The discharge path of capacitor 136 is through resistors 142 and 128 and also through diode 130, resistors 30 and 24. After capacitor 136 has become discharged, the plus voltage at point C helps to restore the multivibrator to its normal operation. A diode 144 is connected between the collector of transistor 112 and the base of multivibrator transistor 112 for on-time control. A local bypass capacitor 146 is coupled as shown.

DESCRIPTION OF OPERATION

The short circuit condition pulse narrowing is performed through transistor 60, the gap sensing network associated therewith, transistors 86, 110 and 112 and the circuitry associated therewith. The open-circuit pulse narrowing is performed through transistor 86, the gap sensing network associated therewith, transistors 110, 112 and the circuitry associated therewith. When normal cutting operation of the electrical discharge machining power supply circuit is proceeding, the multivibrator continuously and without interruption operates, i.e. turns on and off, electronic switch 36. It will be recognized by those familiar with the art that switch 36 may be embodied as a single transistor as illustrated or as a bank of transistors parallel in an output bank configuration for increased power output. It will further be seen that while the illustrative example of my invention relates to transistors, other periodically operable electronic switches may be employed in their place. By "electronic switch," I mean any electronic control device having three or more electrodes comprising at least two principal or power electrodes acting to control current flow in the power circuit, the conductivity between the principal electrodes being controlled by a control electrode within the switch whereby the conductivity of the power circuit is controlled statically or electrically without movement of mechanical elements within the switch. Included within this meaning are vacuum tubes and transistors in which turn-on is accomplished by a control voltage applied to the control electrode and in which turnoff is accomplished automatically in response to the removal of that control voltage. Also included in that definition are devices of the gate type in which turn-on is accomplished by a control voltage applied to the control electrode which control voltage may then be removed and in which turnoff is accomplished by application of a subsequent control voltage to the control electrode. An additional class of electronic switches also called electronic trigger devices falls within this definition and includes ignitrons, thyratrons and semiconductor controlled rectifiers.

During normal machining operation, transistors 60, 86, 110 and 112 are all in their nonconductive state. The machining power pulses are provided to the gap in accordance with the setting of the multivibrator. The frequency of operation, low for roughing and high for finishing operation, is preset by the adjustment of capacitors 20, 22. The machining current level is also preset, this being done by the setting of potentiometer 24. So long as normal machining operation continues, this selected operation continues.

When the operation is started, on initial downfeed, or after a prolonged backup, the gap voltage condition is above the optimum level, i.e., at gap open circuit. It is desirable to reduce the machining current, that is, the pulse power on-time during this condition for reasons hereinbefore stated. During open arc condition, the relatively high gap voltage level is sensed by the sensing network connected across series resistors 46 and 48. The sensing network comprises a first RC network including resistor 94 and capacitor 96. This network is coupled through diode 98 to a second RC network including resistor 108 and capacitor 100. The negative signal voltage, that of transistor 36 on gap open circuit, is stored on capacitor 100 as a negative turn-on signal through resistor 106 for transistor 86. Diode 104 serves as a decoupling diode should short circuit condition exist in which case it would be necessary to prevent the cutoff signal from transistor 60 during short circuit condition from appearing on capacitor 100. This promotes a more stable operation during a gap short circuit condition. The open arc narrowing circuit has a particularly advantageous operation in that it uses a divider network of two RC networks. These comprise resistor 94–capacitor 96 and resistor 108–capacitor 100 separated by diode 98 to provide the negative turn-on signal to be applied between the base and emitter of transistor 86. Resistor 106 provides the necessary limit for transistor 86 drive current. When transistor 86 is turned on, transistor 110 also turns on. The negative voltage of supply B is passed through transistor 110 and diode 130 to hold off multivibrator transistor 10. This provides machining pulse off-time increase and transistor 10 is held off until the variable capacitor 22 is recharged through resistors 26 and 32. Diode 28 serves to decouple charge resistor 32. Resistor 32 is of relatively high magnitude and slowly charges capacitor 22 to provide turn-on of transistor 10. At the same time, while point P is negative, transistor 112 is turned on through the negative signal applied to its base through diode 132 and resistor 134. Capacitor 136 becomes charged to the polarity indicated to maintain point P negative for a predetermined time duration after gap open-circuit condition is removed and transistor 110 has returned to its normal nonconductive state. After the charge on capacitor 136 has leaked off through resistors 142, 128, diode 130, and resistors 30, 24, a positive voltage from supply C is provided to provide normal, interference free operation of the multivibrator.

During gap short circuit condition, the pulse narrowing is initiated by the turn-on of transistor 60. When the gap voltage approaches a short circuit level and drops below the preset reference voltage on potentiometer 72, transistor 60 will be turned on to provide a negative voltage signal to the base of transistor 86 to turn it on with transistors 110 and 112 on to provide on-time narrowing together with off-time widening in the manner described hereinabove for open-circuit narrowing. The regulated voltage source provided provides for effective operation of the short circuit protective network even during very high frequency machining operation. The adjustable turnoff bias control through bias source 47 and potentiometer 92 permits setting of a limit for short circuit current level.

I claim:

1. In an apparatus for machining a conductive workpiece by passing machining power pulses between a tool electrode and said workpiece across a dielectric coolant filled gap, a power supply, an electronic switch having a control electrode and a pair of principal electrodes, said principal electrodes operatively connected between said power supply and said gap for providing machining power pulses thereto, a pulse generator having its pulse output operatively connected to said control electrode of said switch for operating it with predetermined on-off time, wherein the improvement comprises a sensing network operatively connected to the output of said switch and said gap for sensing for the occurrence of actual gap breakdown discharges and for providing an output signal responsive to gap voltage of a magnitude representative of gap open circuit, an electronic switching means operatively connected between said sensing network and said pulse generator responsive to said signal to provide a control output thereto for respectively increasing the off-time and decreasing the on-time of said generator, and a delay means operatively connected to said pulse generator for providing a delayed return to said predetermined on-time, said sensing network comprising a first and a second parallel resistor-capacitor network, each connected in a series combination at opposite terminals of rectifier, said series combination operatively connected across said machining gap.

2. The combination as set forth in claim 1 wherein a second rectifier is connected between said first rectifier and said gap for clamping said control output to the voltage across said gap.

3. The combination as set forth in claim 2 wherein said delay means comprises a resistor-capacitor delay network operatively connected to said generator for delaying its resumption of normal on-time.